United States Patent
Yang

(10) Patent No.: US 10,216,327 B2
(45) Date of Patent: Feb. 26, 2019

(54) NOISE-CANCELLED CAPACITIVE TOUCH DISPLAY APPARATUS

(71) Applicant: Kuan-Yi Yang, HsinChu (TW)

(72) Inventor: Kuan-Yi Yang, HsinChu (TW)

(73) Assignee: PIXART IMAGING INCORPORATION, Hsinchu (TW)

( * ) Notice: Subject to any disclaimer, the term of this patent is extended or adjusted under 35 U.S.C. 154(b) by 233 days.

(21) Appl. No.: 14/633,456

(22) Filed: Feb. 27, 2015

(65) Prior Publication Data

US 2015/0268794 A1    Sep. 24, 2015

(30) Foreign Application Priority Data

Mar. 20, 2014   (TW) .............................. 103110438 A

(51) Int. Cl.
   *G06F 3/041* (2006.01)
   *G06F 3/044* (2006.01)

(52) U.S. Cl.
   CPC ............ *G06F 3/0418* (2013.01); *G06F 3/044* (2013.01)

(58) Field of Classification Search
   CPC ....... G06F 3/044; G06F 3/0418; G06F 3/0416
   See application file for complete search history.

(56) References Cited

U.S. PATENT DOCUMENTS

| | | | | |
|---|---|---|---|---|
| 6,280,552 B1 * | 8/2001 | Bottari | ..................... | G06F 3/045 156/230 |
| 8,497,844 B2 * | 7/2013 | Chen | ....................... | G06F 3/044 341/33 |
| 8,780,284 B2 * | 7/2014 | Kurashima | .............. | G06F 3/044 345/174 |
| 2006/0007171 A1 * | 1/2006 | Burdi | ................... | H03K 17/962 345/173 |
| 2009/0213090 A1 * | 8/2009 | Mamba | ................... | G06F 3/044 345/174 |
| 2009/0322704 A1 * | 12/2009 | Anno | ...................... | G06F 3/044 345/174 |
| 2010/0045632 A1 * | 2/2010 | Yilmaz | ................ | G01D 5/2405 345/174 |
| 2010/0182275 A1 * | 7/2010 | Saitou | ..................... | G06F 3/044 345/174 |
| 2010/0220071 A1 * | 9/2010 | Nishihara | ............. | G06F 3/0416 345/173 |
| 2010/0253646 A1 * | 10/2010 | Hiratsuka | ............... | G06F 3/044 345/174 |

(Continued)

*Primary Examiner* — Sepehr Azari
(74) *Attorney, Agent, or Firm* — Tung & Associates

(57) ABSTRACT

A noise-cancelled capacitive touch display apparatus includes a display panel and a capacitive touch sensor on or above the display panel. The capacitive touch sensor includes plural sensing lines, plural driving lines, plural first signal lines, plural second signal lines and a noise cancellation line. The sensing lines are parallel with each other and extend along a first direction. The driving lines are parallel with each other and extend along a second direction, wherein the second direction intersects the first direction. Each first signal line is located outside of an outermost driving line. Each second signal line is located outside of an outermost sensing line. The noise cancellation line is a cut-off part of a corresponding first signal line or a corresponding second signal line. The noise cancellation line receives the noise generated from the display panel.

8 Claims, 11 Drawing Sheets

(56) References Cited

U.S. PATENT DOCUMENTS

| Publication No. | Date | Name | Classification | Subclass |
|---|---|---|---|---|
| 2010/0301879 A1* | 12/2010 | Philipp | G06F 3/03547 | 324/679 |
| 2011/0007030 A1* | 1/2011 | Mo | G06F 3/044 | 345/174 |
| 2011/0025640 A1* | 2/2011 | Lin | G06F 3/044 | 345/174 |
| 2011/0080376 A1* | 4/2011 | Kuo | G06F 3/0412 | 345/177 |
| 2011/0242001 A1* | 10/2011 | Zhang | G06F 3/043 | 345/173 |
| 2011/0242045 A1 | 10/2011 | Park et al. | | |
| 2012/0075214 A1* | 3/2012 | Kim | G06F 3/041 | 345/173 |
| 2012/0169655 A1* | 7/2012 | Chang | G06F 3/0418 | 345/174 |
| 2012/0326992 A1* | 12/2012 | Yeh | G06F 3/0418 | 345/173 |
| 2013/0147755 A1* | 6/2013 | Lin | G06F 3/0416 | 345/174 |
| 2013/0169585 A1* | 7/2013 | Choon | G06F 3/0416 | 345/174 |
| 2013/0257786 A1* | 10/2013 | Brown | G06F 3/044 | 345/174 |
| 2014/0132552 A1* | 5/2014 | Hoch | G06F 3/044 | 345/174 |
| 2014/0168112 A1* | 6/2014 | Kim | G06F 3/0418 | 345/173 |
| 2014/0198066 A1* | 7/2014 | Yoshida | G06F 3/044 | 345/173 |
| 2014/0340354 A1* | 11/2014 | Liu | G06F 3/044 | 345/174 |
| 2014/0375910 A1* | 12/2014 | Tada | G06F 3/044 | 349/12 |
| 2015/0002458 A1* | 1/2015 | Lee | G06F 3/045 | 345/174 |
| 2015/0068897 A1* | 3/2015 | Neel | G06F 3/044 | 204/407 |
| 2015/0193048 A1* | 7/2015 | Yang | G06F 3/044 | 345/174 |
| 2015/0193066 A1* | 7/2015 | Su | G06F 3/0412 | 345/173 |
| 2015/0242027 A1* | 8/2015 | Kida | G06F 3/0418 | 345/173 |
| 2016/0124550 A1* | 5/2016 | Tada | H05K 1/0289 | 345/173 |
| 2016/0148034 A1* | 5/2016 | Kremin | G06K 9/0002 | 382/124 |

\* cited by examiner

NOISE-CANCELLED CAPACITIVE TOUCH DISPLAY APPARATUS

CROSS REFERENCE

The present invention claims priority to TW 103110438, filed on Mar. 20, 2014.

BACKGROUND OF THE INVENTION

Field of Invention

The present invention relates to a noise-cancelled capacitive touch display apparatus; particularly, it relates to such a noise-cancelled capacitive touch display apparatus capable of obtaining precise noise information from the display panel and effectively blocking the noise.

Description of Related Art

Please refer to FIGS. 1A and 1B. FIG. 1A shows a top view of a conventional capacitive touch display apparatus. FIG. 1B shows a cross sectional view of the conventional capacitive touch display apparatus taken along line X-X' of FIG. 1A. The conventional capacitive touch display apparatus 10 shown in FIG. 1B can be, for example, a mutual capacitance type touch panel. The capacitive touch display apparatus 10 typically comprises a capacitive touch sensor 11 and a display panel 12. The capacitive touch sensor 11 is located on or above the display panel 12; therefore, only the capacitive touch sensor 11 of the conventional capacitive touch display apparatus 10 is shown in the top view of FIG. 1A, because the display panel 12 is located below the capacitive touch sensor 11 (as shown in FIG. 1B) and can not be seen from the top view of FIG. 1A. The display panel 12 can be, for example but not limited to, a liquid crystal display (LCD) panel or an organic light emitting diode (OLED) panel.

The capacitive touch sensor 11 includes plural driving lines DA1~DA9 in columns and plural sensing lines SA1~SA9 in rows. The driving lines DA1~DA9 and the sensing lines SA1~SA9 are located at different layers. The driving lines DA1~DA9 and the sensing lines SA1~SA9 intersect with each other (i.e., each driving line DA1~DA9 intersects every sensing line SA1~SA9 and each sensing line SA1~SA9 intersects every driving line DA1~DA9) so as to form an electric field. For better sensing effect, preferably, the driving lines DA1~DA9 and the sensing lines SA1~SA9 can be arranged orthogonal to each other. As shown by the top view of FIG. 1A, the intersections where the driving lines DA1~DA9 and the sensing lines SA1~SA9 overlap with each other are the sensing nodes N11, N12, N13 . . . , N98, and N99. The capacitive touch sensor 11 can adopt, for example but not limited to, a so-called mutual capacitive type sensing method to sense the touched locations. The so-called mutual capacitive type sensing method is to monitor the capacitance change at each of the sensing nodes N11, N12, N13 . . . , N98, and N99 in the capacitive touch sensor 11 of the conventional capacitive touch display apparatus 10. For example, assuming that the capacitive touch sensor 11 includes J driving lines and K sensing lines, a total of (J×K) individual and spatially separated sensing nodes are thereby formed. In the example shown in FIG. 1A, the capacitive touch sensor 11 includes 9 driving lines DA1~DA9 and 9 sensing lines SA1~SA9, thereby forming a total of 81 individual and spatially separated sensing nodes N11, N12, N13 . . . , N98, and N99. During operation, each of the driving lines DA1~DA9 receives a driving voltage (not shown) and because each of the driving lines DA1~DA9 intersects every one of the sensing lines SA1~SA9 at the intersections (i.e., the sensing nodes N11, N12, N13 . . . , N98, and N99), a mutual capacitance is generated at each node, and a corresponding voltage can be sensed at each node. When a location on the display panel 12 is touched, the mutual capacitance of a corresponding sensing node in the capacitive touch sensor 11 changes, and the sensed voltage correspondingly changes. This feature can therefore be used to determine whether and where the display panel 12 is touched.

Still referring to FIG. 1B, as shown in the figure, the capacitive touch sensor 11 further includes a substrate 14. The sensing lines SA1~SA9 of the capacitive touch sensor 11 can be formed at one side 141 of the substrate 14 and the driving lines DA1~DA9 of the capacitive touch sensor 11 can be formed at an opposite side 142 of the substrate 14. In such configuration, the driving lines DA1~DA9 and the sensing lines SA1~SA9 do not directly contact each other; instead, the driving lines DA1~DA9 and the sensing lines SA1~SA9 are capacitively coupled to each other at the intersections (N11, N12, . . . , N98, N99) with the substrate 14 in between. For example, an overlapping intersection of a driving line (e.g., DA9) and a sensing line (e.g., SA9) forms a sensing node (e.g., N99) as shown in FIG. 1A and FIG. 1B. Such an intersection (i.e., a sensing node) is a position where one of the driving lines DA1~DA9 and one of the sensing lines SA1~SA9 cross or come nearest to each other from top view, but they are in fact at different elevation planes from cross sectional view.

In the capacitive touch sensor 11, for example, the driving line DA9 and the sensing line SA9 are capacitively coupled to each other at the sensing node N99 to generate a mutual capacitance. That is, because the voltage level of the driving line DA9 is different from that of the sensing line SA9, magnetic field lines are formed at the sensing node N99 (as shown in FIG. 1B). FIG. 2 shows an explosion view of FIG. 1B. Generally, in such a configuration wherein the capacitive touch display apparatus 10 is formed by combining the display panel 12 with the capacitive touch sensor 11, the noises generated from the display panel 12 will interfere with the capacitive touch sensor 11. FIG. 2 explains how the noises generated from the display panel 12 interfere with the capacitive touch sensor 11. As compared to a single-layer type capacitive touch sensor 11 (i.e., a capacitive touch sensor whose driving lines and sensing lines are arranged on the same side of a substrate), the two-layers type capacitive touch sensor 11 as shown in FIG. 1B and FIG. 2 can make use of the driving lines DA1~DA9 to block the noises generated from the display panel 12 so that they do not interfere with the capacitive touch sensor 11 (e.g., as shown in FIG. 2, the noise A coming from beneath the driving line DA1 is blocked, so that the noise A will not be capacitively coupled to the sensing line SA9 and therefore there will be no mutual capacitance generated by the noise A coupling with the sensing line SA9).

However, there are gaps between two neighboring driving lines (e.g., between driving lines DA1 and DA2 or driving lines DA8 and DA9), so the noise B generated from the display panel 12 can still be capacitively coupled to the sensing lines (e.g., the sensing line SA9) of the capacitive touch sensor 11 to generate a mutual capacitance by the noise B coupling with the sensing line SA9 (e.g., as shown in FIG. 2, the noise B can pass through the gap between driving lines DA1 and DA2 or the gap between driving lines DA8 and DA9). Thus, the capacitive touch sensor 11 is still affected by the noise B, and the conventional capacitive touch display apparatus 10 can not completely block the noises generated from the display panel 12 to prevent such noises from interfering with the capacitive touch sensor 11.

To overcome the drawback mentioned in the above-mentioned prior art, another prior art proposes to add a grounded shielding layer between the display panel and the capacitive touch sensor, for blocking the noise generated from the display panel. However, such an arrangement not only increases the manufacturing cost but also affects the display performance of the display panel.

Besides the above-mentioned prior art, the following patents and publications are relevant to the present invention: U.S. Pat. Nos. 8,493,356; 8,497,844; US 20060103635; US 20110242045; US 20120001859; US20120306803; US20120326992; US20130057337; US20130069904; US20130147755; US20130169585; US20130176233 and US20130222290. Nevertheless, these prior art references all fail to overcome the drawback mentioned in the above-mentioned prior art of FIGS. 1A-1B and FIG. 2.

In view of the above, to overcome the drawbacks in the prior art, the present invention proposes a noise-cancelled capacitive touch display apparatus capable of obtaining precise noise information from the display panel and effectively blocking the noise.

SUMMARY OF THE INVENTION

From one perspective, the present invention provides a noise-cancelled capacitive touch display apparatus, comprising: a display panel; and a capacitive touch sensor on or above the display panel, wherein the capacitive touch sensor includes: a first electrode and a second electrode which form a mutual capacitance in between, for sensing a signal; a signal line, which is located outside of the first electrode or the second electrode, wherein when the signal line is located outside of the first electrode, from a top view, the signal line overlaps or does not overlap with the second electrode, and when the signal line is located outside of the second electrode, from the top view, the signal line overlaps or does not overlap with the first electrode; and a noise cancellation line for receiving a noise generated from the display panel, wherein the signal line, the noise cancellation line and a gap formed between the signal line, the noise cancellation line form an imaginary rectangle shape.

In one embodiment, the first electrode includes a plurality of sensing lines, which are parallel with each other and extend along a first direction; and the second electrode includes a plurality of driving lines, which are parallel with each other and extend along a second direction, wherein the sensing lines and the driving lines intersect with each other from the top view to form a capacitive electric field, and are located at different elevation levels from a cross sectional view, and wherein the second direction is orthogonal to the first direction; wherein: when the signal line is located outside of an outermost driving line in the first direction and parallel to the second direction, a longer side of the imaginary shape is at least as long as the driving line; and when the signal line is located outside of an outermost sensing line in the second direction and parallel to the first direction, a longer side of the imaginary shape is at least as long as the sensing line.

In one embodiment, the signal line, the noise cancellation line and the driving lines are located at a elevation level from the cross sectional view.

In one embodiment, the signal line, the noise cancellation line and the driving lines are located at a same elevation level from the cross sectional view.

In one embodiment, the driving lines are above the signal line and the noise cancellation line from the cross sectional view.

In one embodiment, a thickness of the noise cancellation line is smaller than a thickness of each driving line.

In one embodiment, a width of the noise cancellation line is smaller than or equal to a width of the signal line.

In one embodiment, the capacitive touch sensor further includes a substrate, and wherein the sensing lines are at a first side of the substrate and the driving lines and the noise cancellation line are at a second side of the substrate opposite to the first side.

In one embodiment, a voltage level of the signal line is higher than or lower than a voltage level of each driving line.

In one embodiment, the noise-cancelled capacitive touch display apparatus further comprises: a shielding layer, which extends along a direction parallel with an extending direction of the noise cancellation line, wherein the shielding layer and the noise cancellation line overlap with each other to form an overlapping area, and wherein the shielding layer and the sensing lines are located at a same elevation level from a cross sectional view; whereby an electric field wall is formed between the shielding layer and the noise cancellation line to block a signal generated from the driving lines from interfering with the noise cancellation line.

In one embodiment, the overlapping area is smaller than 10% of a top view area of the noise cancellation line.

In one embodiment, the noise-cancelled capacitive touch display apparatus further comprises: a shielding layer, which extends along a direction parallel with an extending direction of the noise cancellation line, wherein the shielding layer is located between an outermost driving line and the noise cancellation line from a cross sectional view; and the shielding layer and the driving lines are located at a same elevation level from a cross sectional view; whereby the shielding layer blocks a signal generated from the driving line from interfering with the noise cancellation line.

In one embodiment, the shielding layer is connected to ground.

In one embodiment, the noise-cancelled capacitive touch display apparatus further comprises: a detection circuit, which is coupled to the sensing lines and the noise cancellation line, wherein the detection circuit generates a noise-cancelled sensed signal according to a noise received by the noise cancellation line and a sensed signal generated from each sensing line.

From another perspective, the present invention provides a noise-cancelled capacitive touch display apparatus, comprising: a display panel; and a capacitive touch sensor, which is on or above the display panel, wherein the capacitive touch sensor includes: an active signal area; and a noise cancellation area; wherein the active signal area includes: a plurality of sensing lines, which are parallel with each other and extend along a first direction; and a plurality of driving lines, which are parallel with each other and extend along a second direction, wherein the sensing lines and the driving lines intersect with each other from a top view to form a capacitive electric field, and wherein the second direction is orthogonal to the first direction; and wherein the noise cancellation area includes: a noise cancellation sensing line, which is parallel with the first direction and located outside of the sensing lines of the active signal area; and a plurality of noise cancellation driving lines, which are parallel with each other and extend along a second direction, wherein the noise cancellation sensing line and the noise cancellation driving lines intersect with each other from a top view and are located at different elevation levels from a cross sectional view; wherein each noise cancellation driving line of the noise cancellation area does not directly connect each driving line of the active signal area, and each noise cancellation driving line of the noise cancellation area is not at a same voltage level as each driving line of the active signal area; whereby the noise cancellation sensing line receives a noise generated from the display panel.

In one embodiment, the sensing lines and the driving lines are located at different elevation levels from the cross sectional view.

In one embodiment, the noise cancellation driving lines and the driving lines are located at a same elevation level from the cross sectional view.

In one embodiment, the capacitive touch sensor further includes a substrate, wherein the sensing lines and the noise cancellation sensing line are at a first side of the substrate and the driving lines and the noise cancellation driving lines are at a second side of the substrate opposite to the first side.

In one embodiment, the noise cancellation driving lines are connected to each other in serial and are all connected to ground.

In one embodiment, the noise-cancelled capacitive touch display apparatus further comprises: a detection circuit, which is coupled to the sensing lines and the noise cancellation sensing line, wherein the detection circuit generates a noise-cancelled sensed signal according to a noise received by the noise cancellation line and a sensed signal generated from each sensing line.

The objectives, technical details, features, and effects of the present invention will be better understood with regard to the detailed description of the embodiments below, with reference to the attached drawings.

DESCRIPTION OF THE PREFERRED EMBODIMENTS

Figure 1A:
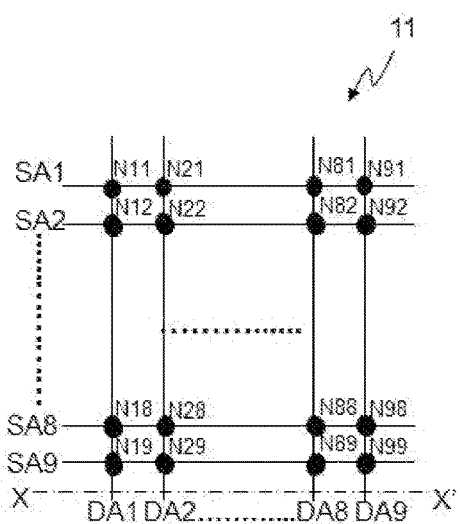
FIG. 1A shows a top view of a conventional capacitive touch display apparatus.

The above and other technical details, features and effects of the present invention will be will be better understood with regard to the detailed description of the embodiments below, with reference to the drawings. In the description, the words relate to directions such as "upper", "lower", "left", "right", "forward", "backward", etc. are used to illustrate relative orientations in the drawings and should not be considered as limiting in any way. The drawings as referred to throughout the description of the present invention are for illustration only, to show the interrelations between the layers and the components, but not drawn according to actual scale.

Figure 3A:
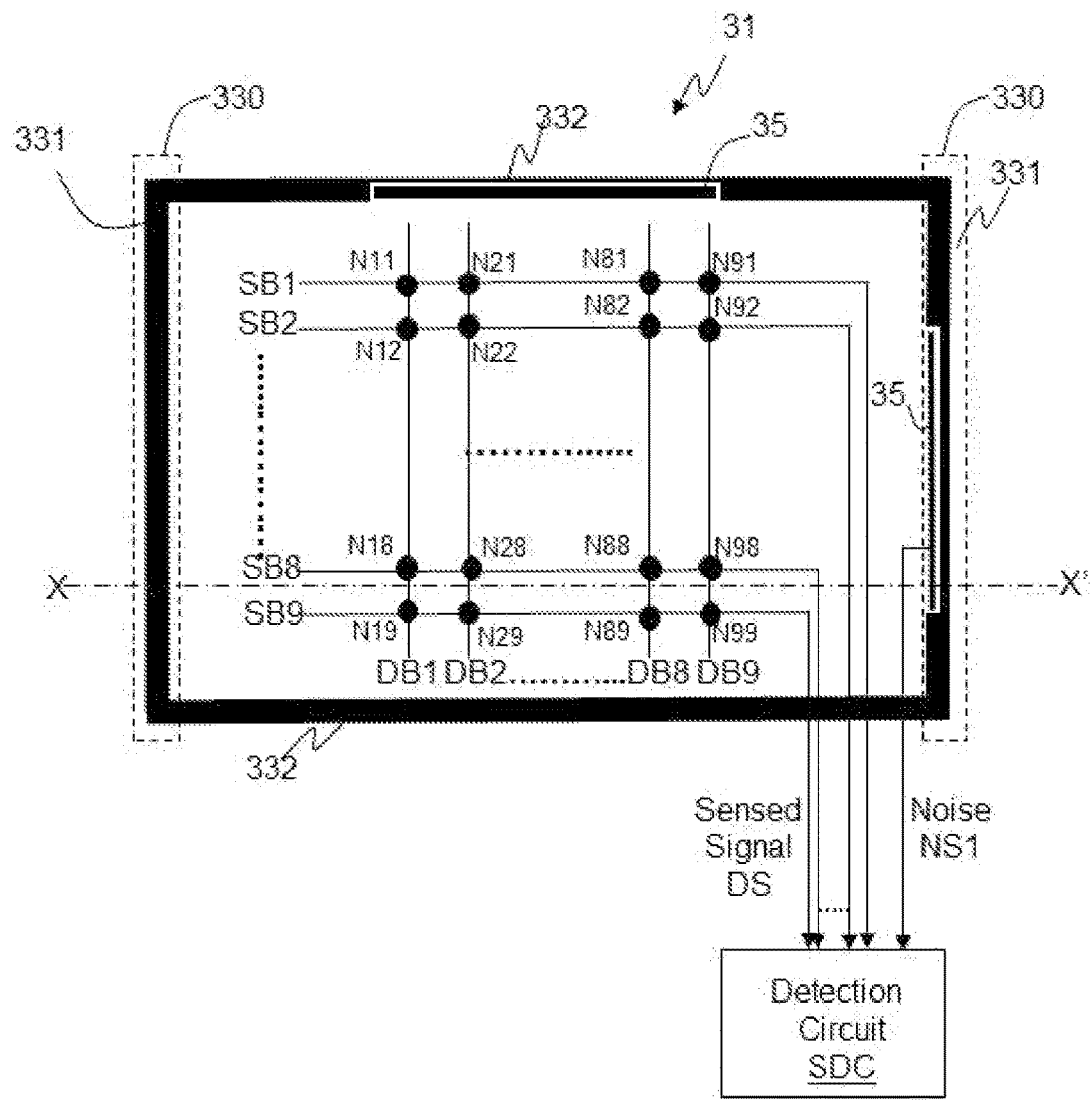
FIG. 3A shows a top view of a noise-cancelled capacitive touch display apparatus according to a first embodiment of the present invention.
Figure 3B:
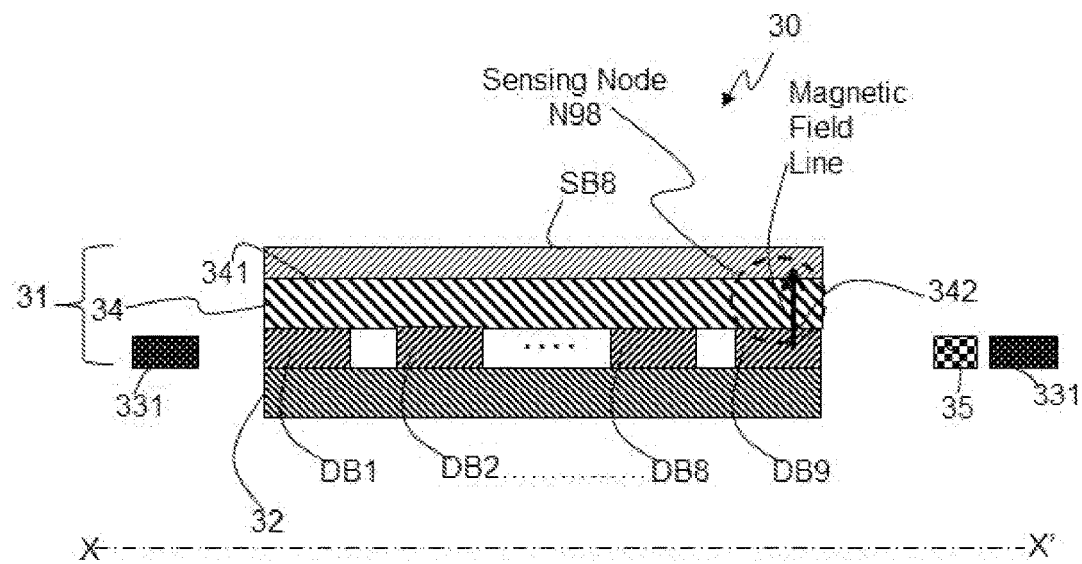
FIG. 3B shows a cross sectional view of the first embodiment of the present invention taken along X-X' line of FIG. 3A.
Figure 3C:
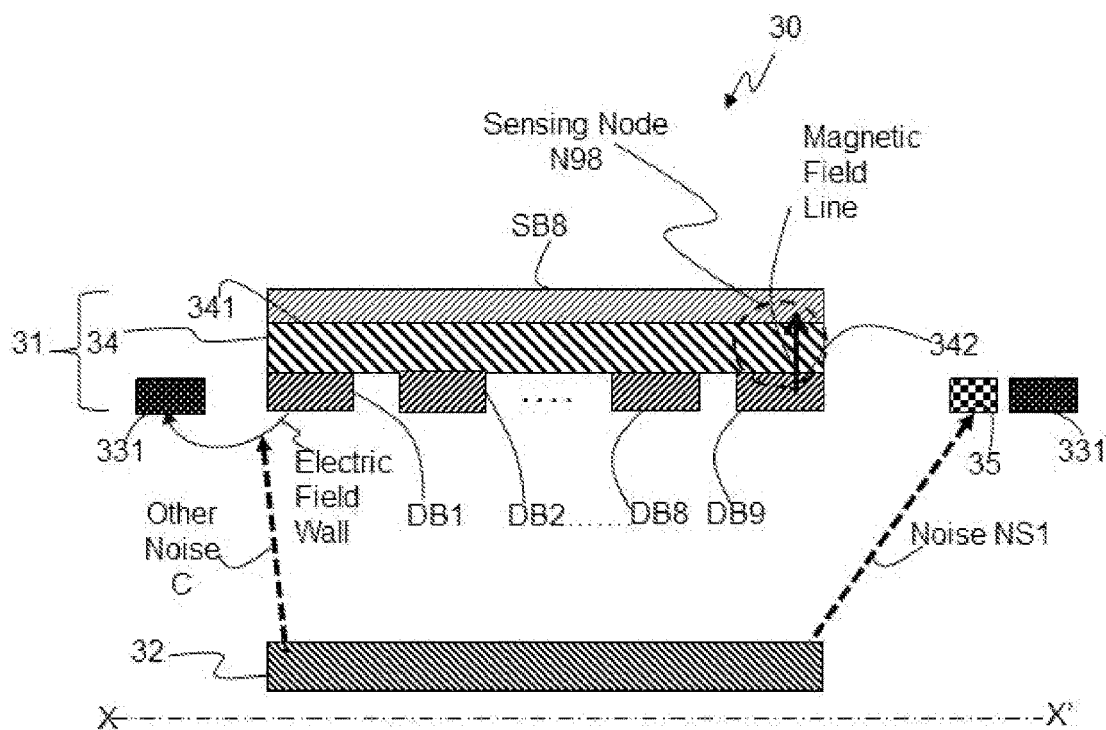
FIG. 3C shows an explosion view of FIG. 3B.

Please refer to FIGS. 3A-3C. FIG. 3A shows a top view of a noise-cancelled capacitive touch display apparatus according to a first embodiment of the present invention. FIG. 3B shows a cross sectional view of the first embodiment of the present invention taken along X-X' line of FIG. 3A. FIG. 3C shows an explosion view of FIG. 3B. The noise-cancelled capacitive touch display apparatus 30 shown in FIG. 3B can be, for example, a mutual capacitance type touch panel. The noise-cancelled capacitive touch display apparatus 30 typically comprises a capacitive touch sensor 31 and a display panel 32. The capacitive touch sensor 31 is on or above the display panel 32. In one embodiment, the capacitive touch sensor 31 and the display panel 32 can be bonded to each other through, for example but not limited to, a transparent adhesive. Only the capacitive touch sensor 31 of the noise-cancelled capacitive touch display apparatus 30 is shown in the top view of FIG. 3A, because the display panel 32 is located below the capacitive touch sensor 31 (as shown in FIG. 3B) and can not be seen from the top view of FIG. 3A. The display panel 12 can be, for example but not limited to, a liquid crystal display (LCD) panel or an organic light emitting diode (OLED) panel.

Figure 3D:
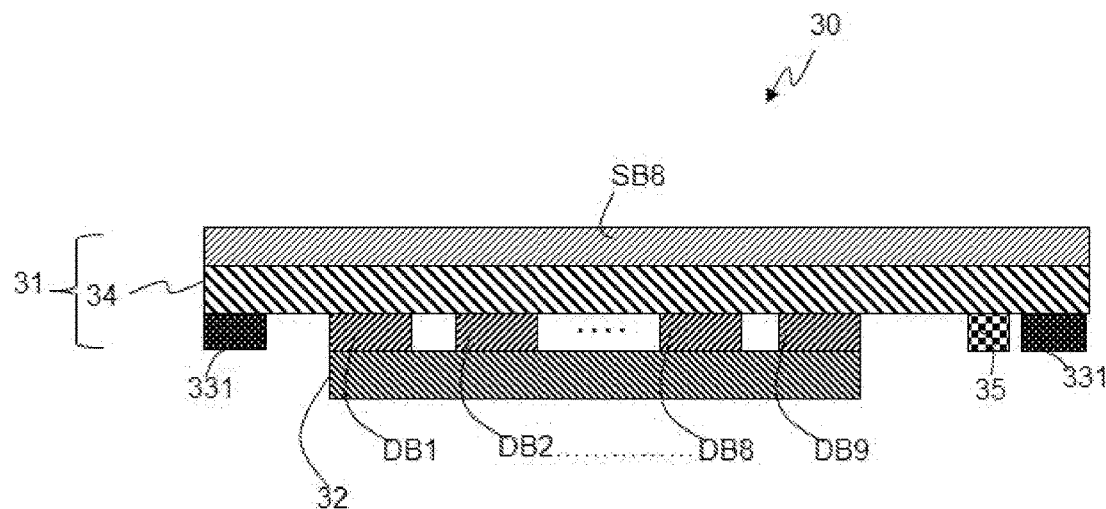
FIGS. 3D and 3E show a second embodiment and a third embodiment of a noise-cancelled capacitive touch display apparatus of the present invention, respectively.
Figure 3E:
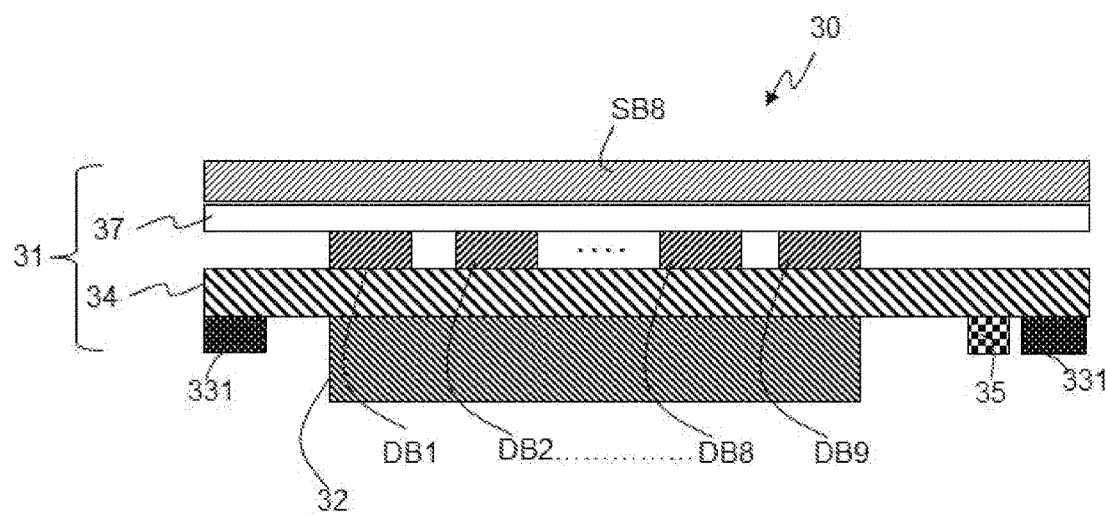

As shown in FIG. 3A, the capacitive touch sensor 31 includes plural distinct driving lines DB1~DB9 in columns and plural distinct sensing lines SB1~SB9 in rows. Each of the sensing lines SB1~SB9 forms a first electrode and each of the driving lines DB1~DB9 forms a second electrode. At an intersection where each first electrode and each second electrode intersect with each other, a mutual capacitance is formed between the first electrode and the second electrode, for sensing a signal. In the capacitive touch sensor 31, the sensing lines SB1~SB9 are parallel with each other and extend along a first direction (e.g., the lateral direction in this embodiment), and the driving lines DB1~DB9 are parallel with each other and extend along a second direction (e.g., the longitudinal direction in this embodiment). Preferably, the above-mentioned first direction and second direction are orthogonal to each other; however, this is only preferable but not absolutely necessary, and it is also practicable as long as the sensing lines SB1~SB9 and the driving lines DB1~DB9, from a top view of FIG. 3A, intersect with each other. As shown in FIG. 3A, the driving lines DB1~DB9 and the sensing lines SB1~SB9 intersect with each other so as to form a capacitive electric field. The driving lines DB1~DB9 and the sensing lines SB1~SB9 are located at different elevation levels as shown in the cross-sectional view of FIG. 3B. To enhance the sensing efficiency, preferably, the driving lines DB1~DB9 and the sensing lines SB1~SB9 can be arranged, for example, orthogonal to each other, and it is shown so in the embodiments of the present invention. However, the present invention is not limited to the orthogonal arrangement. Note that the term "parallel" does not need to be strictly parallel, and certain impreciseness is allowable. It is simply required for the sensing lines SB1~SB9 to be spaced apart from one another and the driving lines DB1~DB9 to be spaced apart one another. In this embodiment, the driving lines DB1~DB9 and the sensing lines SB1~SB9 are at different layers and at different sides of a substrate 34. However, it is practicable to arrange the driving lines DB1~DB9 and the sensing lines SB1~SB9 at a same layer or at a same side of the substrate 34 (as shown in FIG. 3E, to be both at an upper side or a lower side of the substrate 34, wherein the reference number "37" indicates a spacing layer).

In one embodiment, each of the sensing lines SB1~SB9 includes one or several sensing electrodes, and each of the driving line DB1~DB9 includes one or several driving electrodes. The sensing electrodes or a part of the sensing electrodes can be made of, for example, one or several metal conductive meshes or Indium Tin Oxide (ITO). The driving electrodes or a part of the driving electrodes can be made of, for example, one or several metal conductive meshes or Indium Tin Oxide (ITO). The sensing electrodes and the driving electrodes can be disposed at any positions depending on layout requirements and circuit design. For example, the sensing electrodes can be disposed at two ends of the sensing lines SB1~SB9 and the driving electrodes can be disposed at two ends of the driving lines DB1~DB9.

Figure 1B:
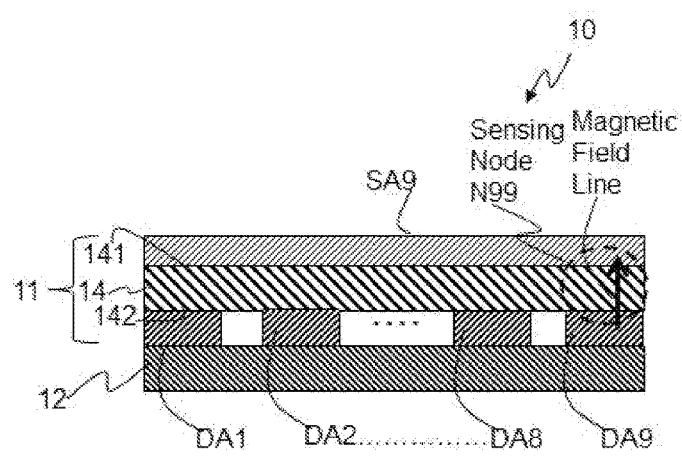
FIG. 1B shows a cross sectional view of the conventional capacitive touch display apparatus taken along X-X' line of FIG. 1A.
Figure 2:
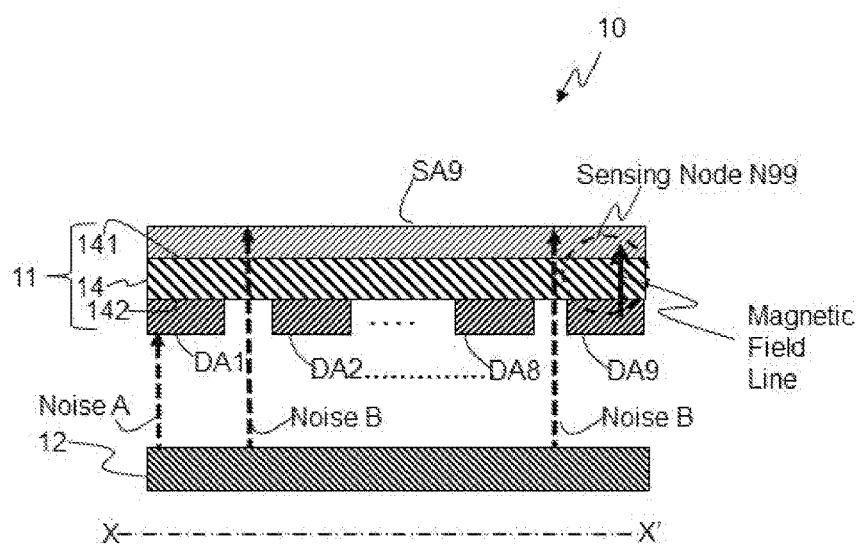
FIG. 2 shows an explosion view of FIG. 1B.

As compared with the conventional capacitive touch display apparatus 10 shown in FIGS. 1A, 1B and 2, the noise-cancelled capacitive touch display apparatus 30 in this embodiment further includes plural first signal lines 331, plural second signal lines 332 and a noise cancellation line 35. In this embodiment, the first signal lines 331 are located outside of two outermost driving lines DB1 and DB9 and the second signal lines 332 are located outside of two outermost sensing lines SB1 and SB9. That is, as shown in FIG. 3A, from a top view, the first signal lines 331 of this embodiment are located outside of two outermost driving lines DB1 and DB9 in the first direction (which is, for example, the lateral direction in this embodiment) and/or the second signal lines 332 of this embodiment are located outside of two outermost sensing lines SB1 and SB9 in the second direction (which is, for example, the longitudinal direction in this embodiment). As shown in FIG. 3B, from a cross sectional view, the first signal lines 331, the second signal lines 332 and the driving lines DB1~DB9 are all at a same side 342 of the substrate 34 (the second signal lines 332 are not shown in FIG. 3B due to the perspective), wherein the first signal lines 331 and the second signal lines 332 do not directly connect to the driving lines DB1~DB9. The first signal lines 331 and the second signal lines 332 can be connected to appropriate voltage levels, which are for example but not limited to a ground level. Because the voltage levels of the driving lines DB1~DB9 are different from the voltage levels of the first signal lines 331 and the second signal lines 332, electric field walls are formed between the first signal lines 331 and the two outermost driving lines DB1 and DB9, and electric field walls are also formed between the second signal lines 332 and the two ends of the driving lines DB1~DB9, thereby blocking the undesirable noises (referring FIG. 3C, the noise C is blocked by an electric field wall). In this embodiment, the first signal lines 331, the second signal lines 332 and the driving lines DB1~DB9 are all at the same side 342 of the substrate 34 and located at a same elevation level from the cross sectional view. However, the present invention is not limited to this arrangement; it is also practicable and within the scope of the present invention that the first signal lines 331, the second signal lines 332 and the driving lines DB1~DB9 are located at different elevation levels or at different sides 341 and 342 of the substrate 34 from the cross sectional view, as long as electric field walls for blocking the noises can be formed.

In addition to the above-mentioned noise blockage function through electric field walls, the capacitive touch sensor 31 of the noise-cancelled capacitive touch display apparatus 30 in this embodiment further includes a noise cancellation line 35 (the features and advantages of the noise cancellation line 35 will be discussed later). The noise cancellation line 35 is located near the first signal lines 331 or the second signal lines 332. The noise cancellation line 35 can be formed by a part of an original shape of one of the first signal lines 331 or one of the second signal lines 332. FIG. 3A shows two noise cancellation lines 35, one at an upper side and the other noise at a right side. Such an arrangement of the noise cancellation lines 35 are for illustrative purpose, but not for limiting the scope of the present invention. There can be only one noise cancellation line 35 instead of two noise cancellation lines 35, and the noise cancellation lines 35 can be arranged at a lower side or a left side. The so-called "formed by a part of an original shape" as described herein can be better understood by referring to the embodiment shown in FIG. 3A. An original shape 330 of the first signal line 331 is a rectangle, as shown by the first signal line 331 at the left side of FIG. 3A. A longer side of this rectangle is at least as long as (at least has the same length as) the driving lines DB1~DB9. However, referring to the first signal line 331 shown at the right side of FIG. 3A, it is not the original rectangle shape 330. It can be regarded as that the noise cancellation line 35 is formed by a part of an original shape 330 of the right side first signal line 331. Or, it can also be regarded as that the right side first signal line 331, the noise cancellation line 35 and a gap in between together form an imaginary shape, which is a rectangle and the longer side of this imaginary shape is at least as long as (at least has the same length as) as the driving lines DB1~DB9. Preferably, the shorter side of this imaginary shape is not longer than the width of the original shape, i.e., the shorter side of this imaginary shape is not longer than the shorter side of the left side first signal line 331. Because the noise cancellation line 35 of this embodiment is formed by a part of the first signal lines 331, the noise cancellation line 35 can be at the same side 342 of the substrate 34 as the driving lines DB1~DB9.

Similarly, if the noise cancellation line 35 is formed by a part of an original shape of the second signal lines 332, it can be regarded as that the upper side second signal line 332, the noise cancellation line 35 and a gap formed in between form an imaginary shape, which is a rectangle and the longer side of this imaginary shape is at least as long as (at least has the same length as) the sensing lines SB1~SB9. Preferably, the shorter side of this imaginary shape is not longer than the width of the original shape, i.e., the shorter side of this imaginary shape is not longer than the shorter side of the lower side second signal line 332.

In the above description, the original shape and the imaginary shape are described as a "rectangle", which means "substantially rectangle" and is not necessarily to be a precise and perfect rectangle. For example, a micro damage of the first signal lines 331 or the second signal lines 332 may occur during the manufacturing process, or the edge of the lines may be rounded during the manufacturing process, or the lines may not be perfectly straight. Such imperfectness is allowable.

Still referring to FIGS. 3A-3B, the sensing nodes N11, N12, N13 . . . , N98, and N99 are provided, from the top view of FIG. 3A, at the intersections where the driving lines DB1~DB9 and the sensing lines SB1~SB9 overlap with one another. The capacitive touch sensor 31 of this embodiment can adopt, for example but not limited to, a so-called mutual capacitive type sensing method to sense the touched points (i.e., the positions which correspond to the intersections where the driving lines DB1~DB9 and the sensing lines SB1~SB9 overlap with one another) on the display panel 32. The so-called mutual capacitive type sensing method is to monitor the change in capacitance that occurs at each of the sensing nodes N11, N12, N13 . . . , N98, and N99 in the capacitive touch sensor 31 of the noise-cancelled capacitive touch display apparatus 30. For example, assuming that the capacitive touch sensor 31 includes J driving lines and K sensing lines, a total of (J×K) individual and spatially separated sensing nodes are formed. For example, as shown in FIG. 3A, the capacitive touch sensor 31 includes 9 driving lines DB1~DB9 and 9 sensing lines SB1~SB9, forming a total of 81 individual and spatially separated sensing nodes N11, N12, N13 . . . , N98, and N99. During operation, each of the driving lines DB1~DB9 is supplied by a driving voltage, and the charges of the driving lines DB1~DB9 are capacitively coupled to the corresponding sensing lines SB1~SB9 at each of the intersections (i.e., the sensing nodes N11, N12, N13 . . . , N98, N99) to generate corresponding voltages sensible by the sensing lines SB1~SB9. (Note that the driving lines DB1~DB9 and the sensing lines SB1~SB9 do not directly contact each other; the term "intersections" as described herein indicates that the driving lines DB1~DB9 and the sensing lines SB1~SB9 overlap with one another from a top view of FIG. 3A). For example, an intersection where a driving line (e.g., DB9) overlaps a sensing line (e.g., SB8) forms a mutual capacitance at the corresponding sensing node (e.g., N98), as shown in FIG. 3A and FIG. 3B. That is, because the driving line DB9 and the sensing line SB8 are respectively at different voltage levels, a magnetic field line is generated at the sensing node N98 (as shown in FIG. 3B). When an object touches the display panel 32, a change occurs in the mutual capacitance of the sensing node corresponding to the touched position in the capacitive touch sensor 31, and the sensed voltage correspondingly changes. This feature can therefore be used to determine whether and where the display panel 32 is touched.

Note that the numbers of the driving lines DB1~DB9 and the sensing lines SB1~SB9 are for illustrative purpose only, and the present invention is of course not limited to these numbers. In addition, although the first signal lines 331 and the second signal lines 332 as shown in FIGS. 3A-3C are located outside of the driving lines DB1~DB9 and the sensing lines SB1~SB9 and do not overlap with the driving lines DB1~DB9 and the sensing lines SB1~SB9 from a top view, the present invention is not limited to such arrangement. Please refer to the embodiments shown in FIGS. 3D-3E, the driving lines DB1~DB9 and the sensing lines SB1~SB9 can extend to overlap the second signal lines 332 and the first signal lines 331. That is, from a top view, the driving lines DB1~DB9 can overlap the second signal lines 332 and/or the sensing lines SB1~SB9 can overlap the first signal lines 331. In one embodiment, the driving lines DB1~DB9 and the sensing lines SB1~SB9 form a sensing array, wherein the first signal lines 331 and the second signal lines 332 can form an outer border of this sensing array. In short, the description that the first signal lines 331 and the second signal lines 332 are located "outside" of the driving lines DB1~DB9 and the sensing lines SB1~SB9 is meant to include the conditions that, from a top view, the driving lines DB1~DB9 overlap or do not overlap the second signal lines 332, and/or the sensing lines SB1~SB9 overlap or do not overlap the first signal lines 331 (the first signal lines 331 and/or the second signal lines 332 can form an outer border of the driving lines DB1~DB9 and/or the sensing lines SB1~SB9).

Please still refer to FIG. 3B. As shown in FIG. 3B, the capacitive touch sensor 31 further includes a substrate 34. The sensing lines SB1~SB9 of the capacitive touch sensor 31 can be at one side 341 of the substrate 34 and the driving lines DB1~DB9 of the capacitive touch sensor 31 can be at another side 342 of the substrate 34. That is, the substrate 34 is between the sensing lines SB1~SB9 and the driving lines DB1~DB9, whereby the sensing lines SB1~SB9, the substrate 34 and the driving lines DB1~DB9 are stacked (from top to bottom in FIG. 3B) to form the noise-cancelled capacitive touch display apparatus 30.

In one embodiment, the substrate 34 can be a transparent insulating thin plate whose material can be selected from the group consisting of, for example but not limited to: glass, polycarbonate (PC), polyester (PET), polymethyl methacrylate (PMMA) or cyclic olefin copolymer (COC).

Please refer to FIG. 3C, which shows an explosion view of FIG. 3B. FIG. 3C demonstrates that the noise-cancelled capacitive touch display apparatus 30 of this embodiment not only can block the noise by the formation of electric field walls, but also can detect the noise NS1 generated from the display panel 32 by the noise cancellation line 35. Thus, the effect caused by the noise can be calculated and cancelled from the sensed signal. In one embodiment, the voltage level of the noise cancellation line 35 can be connected to a voltage level which is suitable for calculation purpose. For example, if for purpose of noise cancellation, it needs to calculate how the noise interferes with the driving lines DB1~DB9, the voltage level of the noise cancellation line 35 can be connected to a same voltage level as the driving lines DB1~DB9. Therefore, the noise cancellation line 35 may be connected to different voltage levels as required.

In one embodiment, a thickness of the first signal line 331 or the second signal line 332 which is at the same side as the noise cancellation line 35 is smaller than a thickness of each driving line DB1~DB9. Because the noise cancellation line 35 is formed by a part of the first signal lines 331 or the second signal lines 332, a thickness of the noise cancellation line 35 is also smaller than the thickness of each driving line DB1~DB9. The purpose for the thickness of the first signal line 331 or the second signal line 332 at same side as the noise cancellation line 35 to be smaller than the thickness of each driving lines DB1~DB9 is to make it difficult for an electric field wall to be formed between the driving line DB9 and the first signal line 331 outside of the driving line DB9, lest the electric field wall blocks the detection of the noise NS1. In one embodiment, the first signal lines 331, the second signal lines 332 and the noise cancellation line 35 can be made of a copper foil plate or a flexible print circuit (FPC).

By the above arrangement, the noise cancellation line 35 of this embodiment is capable of receiving the noise NS1 from the display panel 32 completely and therefore obtaining precise information of the noise NS1. A detection circuit SDC (as shown in FIG. 3A) can perform a noise cancellation process according to the noise NS1 received by the noise cancellation line 35 and a sensed signal DS generated from each of the sensing lines SB1~SB9, to obtain a noise-cancelled sensed signal WS (please refer to FIG. 8; the details as to how the detection circuit SDC perform a noise cancellation process according to the noise NS1 received by the noise cancellation line 35 will be discussed later). Consequently, by the noise cancellation line 35 which obtains the precise information of the noise NS1 from the display panel 32, this embodiment can correctly calculate the influences caused by the noise NS1.

Figure 4A:
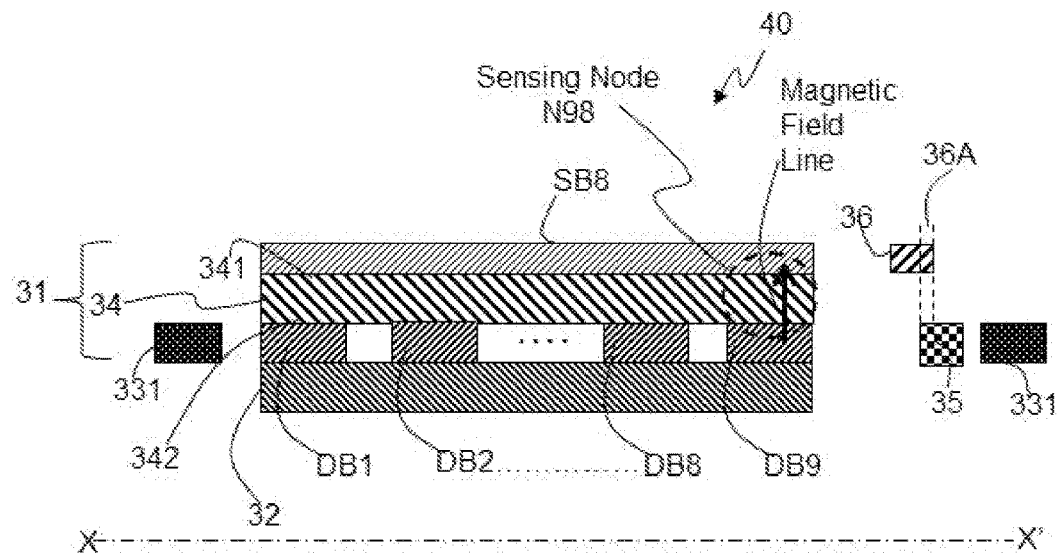
FIG. 4A shows a cross sectional view of a noise-cancelled capacitive touch display apparatus according to a fourth embodiment of the present invention.
Figure 4B:
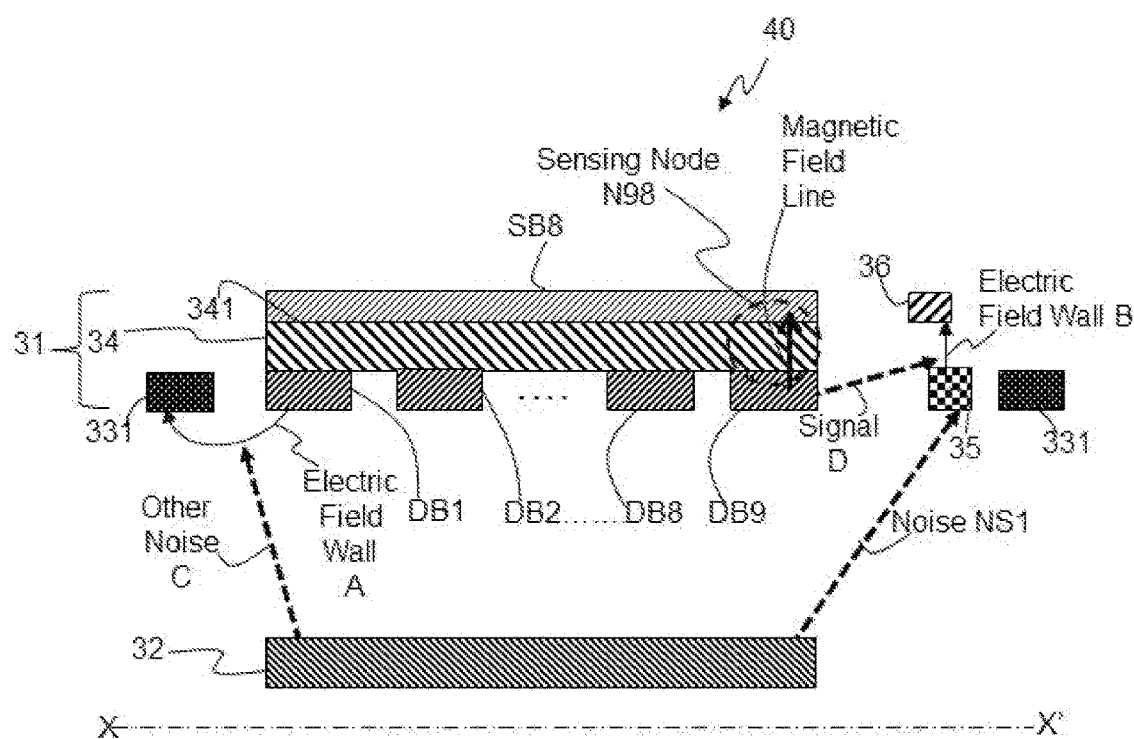
FIG. 4B shows an explosion view of FIG. 4A.

Please refer to both FIGS. 4A and 4B. FIG. 4A shows a cross sectional view of a noise-cancelled capacitive touch display apparatus according to a fourth embodiment of the present invention. FIG. 4B shows an explosion view of FIG. 4A. The noise-cancelled capacitive touch display apparatus of the fourth embodiment operates according to substantially the same mechanism as the noise-cancelled capacitive touch display apparatus 30 of the first embodiment, but is different in that: the noise-cancelled capacitive touch display apparatus 40 of this embodiment further includes a shielding layer 36. As shown in FIG. 4A, the shielding layer 36 extends along a direction parallel with an extending direction of the noise cancellation line 35. That is, the shielding layer 36 is located at the same side 341 of the substrate 34 as the sensing lines SB1~SB9, but is located at a layer different from the noise cancellation line 35 (i.e., the shielding layer 36 is at the same side 341 as the sensing lines SB1~SB9, but is at the opposite side 342 with respect to the driving lines DB1~DB9). In addition, as shown in the cross sectional view, the shielding layer 36 and the noise cancellation line 35 are at different elevation levels and do not directly contact each other; however, the shielding layer 36 and the noise cancellation line 35 overlap with each other (from a top view) to form an overlapping area 36A. A voltage level of the shielding layer 36 can be higher than or lower than a voltage level of the noise cancellation line 35. For example, the shielding layer 36 can be, for example but not limited to, connected to ground. When the shielding layer 36 is connected to ground, the voltage level of the noise cancellation line 35 can be higher than or lower than the ground voltage level. As a result, an electric field wall B is formed between the shielding layer 36 and the noise cancellation line 35, wherein the shielding layer 36 can be regarded as a first electrode (i.e., an upper electrode) of the electric field wall B, whereas the noise cancellation line 35 can be regarded as a second electrode (i.e., a lower electrode) of the electric field wall B. Consequently, the electric field wall B can shield (or attract) the signal D generated from the driving line DB9, such that the the signal D does not interfere with the noise cancellation line 35. The shielding layer 36 provides a benefit that the noise cancellation line 35 can receive precise information of the noise NS1 generated from the display panel 32 without being distorted by any signal (e.g. signal D) generated from the driving lines DB1~DB9, such that the noise cancellation process can be precise and unaffected.

Besides, note that, as shown in FIG. 4A, the overlapping area 36A formed between the shielding layer 36 and the noise cancellation line 35 is preferably very small (e.g., smaller than 10% of a top view area of the noise cancellation line 35). Such arrangement provides a benefit that: it is simply required to use a very small portion (i.e., the overlapping area 36A) of the noise cancellation line 35 to form the electric field wall B with the shielding layer 36, so that most part of the noise cancellation line 35 can contribute to the function of receiving the noise NS1 generated from the display panel 32.

In addition to the above-mentioned differences, the noise-cancelled capacitive touch display apparatus 40 of the fourth embodiment has substantially the same advantages and efficacies as the noise-cancelled capacitive touch display apparatus 30 of the first embodiment, which are not redundantly repeated here.

Figure 5A:
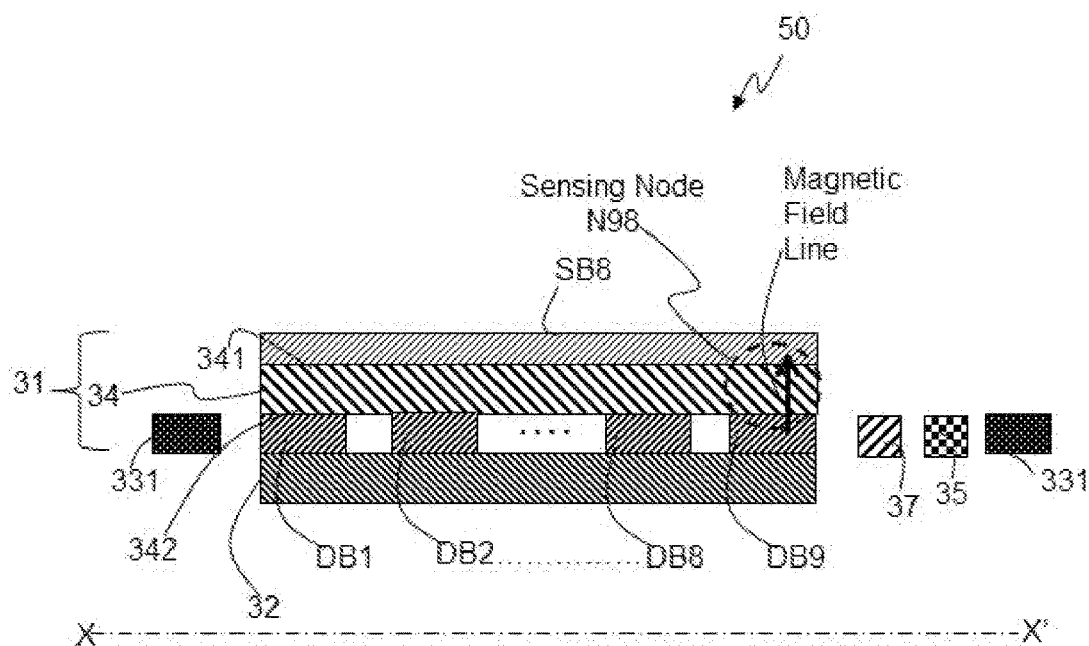
FIG. 5A shows a cross sectional view of a noise-cancelled capacitive touch display apparatus according to a fifth embodiment of the present invention.
Figure 5B:
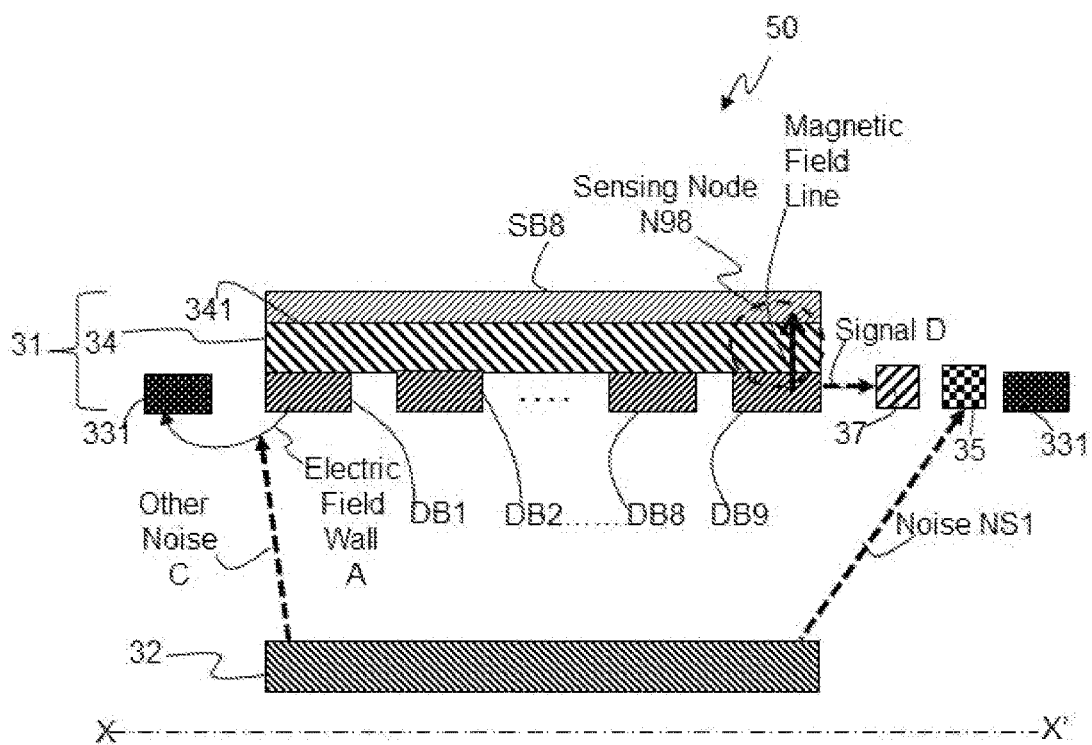
FIG. 5B shows an explosion view of FIG. 5A.

Please refer to both FIGS. 5A and 5B. FIG. 5A shows a cross sectional view of a noise-cancelled capacitive touch display apparatus according to a fifth embodiment of the present invention. FIG. 5B shows an explosion view of FIG. 5A. The noise-cancelled capacitive touch display apparatus 50 of the fifth embodiment operates according to substantially the same mechanism as the noise-cancelled capacitive touch display apparatus 30 of the first embodiment, but is different in that: the noise-cancelled capacitive touch display apparatus 50 of this embodiment further includes a shielding layer 37. As shown in FIG. 5A, the shielding layer 37 extends along a direction parallel with an extending direction of the noise cancellation line 35. That is, the shielding layer 37 is located at the same side 342 of the substrate 34 as the driving lines DB1~DB9 (i.e., the shielding layer 37 is at the same side 342 as the driving lines DB1~DB9, but is at the opposite side 342 with respect to the sensing lines SB1~SB9). In this embodiment, the shielding layer 37 is located at a same layer as the driving lines DB1~DB9 and the noise cancellation line 35. From the cross sectional view, although the shielding layer 37 and the noise cancellation line 35 are at the same layer, they do not directly contact each other, and the shielding layer 37 is located between the driving line DB9 and the noise cancellation line 35.

A voltage level of the shielding layer 37 can be higher than or lower than a voltage level of the noise cancellation line 35. For example, the shielding layer 37 can be, for example but not limited to, connected to ground. When the shielding layer 37 is connected to ground, the voltage level of the noise cancellation line 35 can be higher than or lower than the ground voltage level. As a result, the shielding layer 37 can block the interference of signal D generated from the driving line DB9, so that the signal D does not interfere with the noise cancellation line 35. The shielding layer 37 provides a benefit that the noise cancellation line 35 can receive precise information of the noise NS1 generated from the display panel 32 without being distorted by any signal (e.g. signal D) generated from the driving lines DB1~DB9, such that the noise cancellation process can be precise and unaffected.

In addition to the above-mentioned differences, the noise-cancelled capacitive touch display apparatus 50 of the fifth embodiment has substantially the same advantages and efficacies as the noise-cancelled capacitive touch display apparatus 30 of the first embodiment, which are not redundantly repeated here.

Figure 6A:
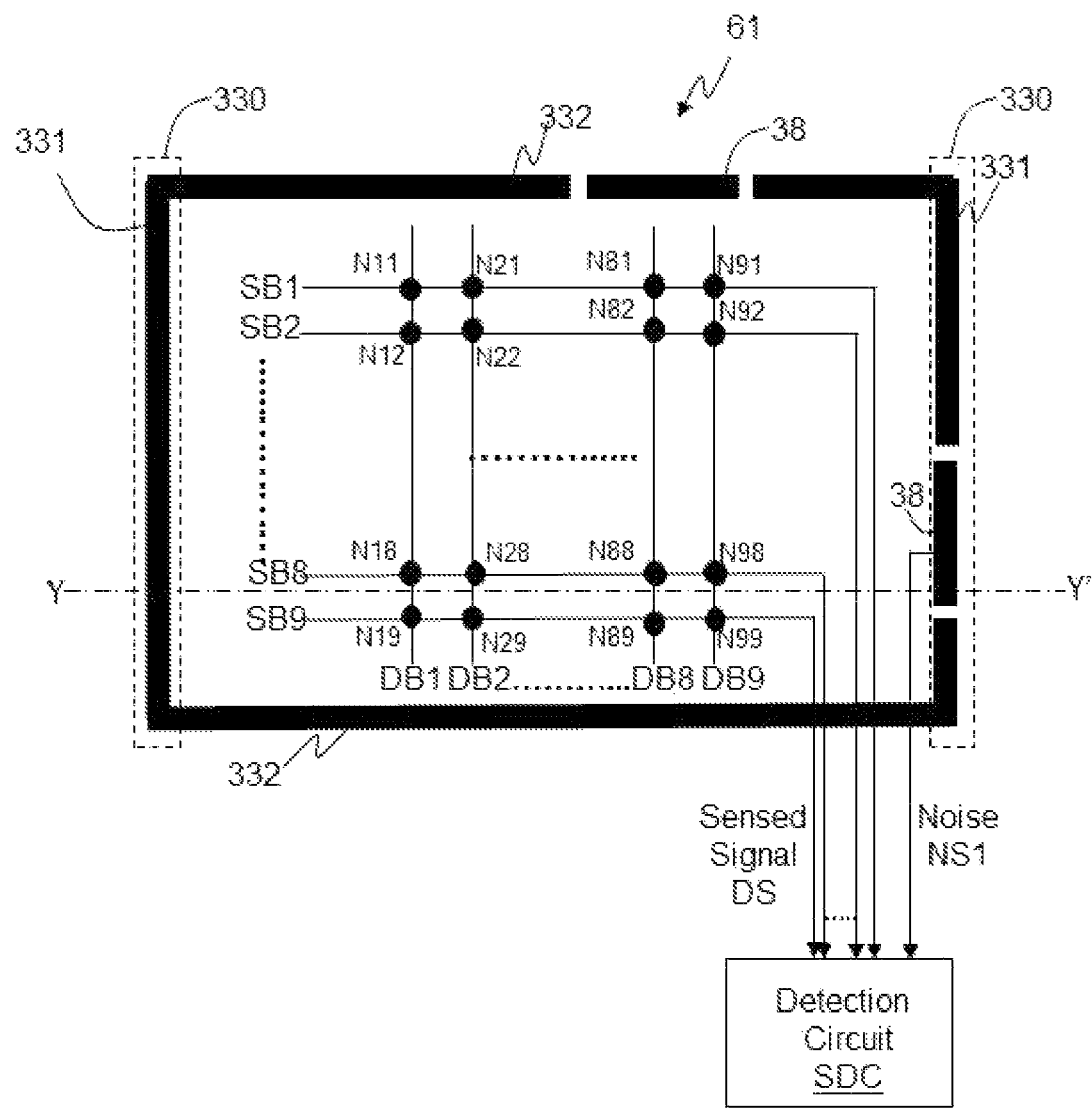
FIG. 6A shows a top view of a noise-cancelled capacitive touch display apparatus according to a sixth embodiment of the present invention.
Figure 6B:
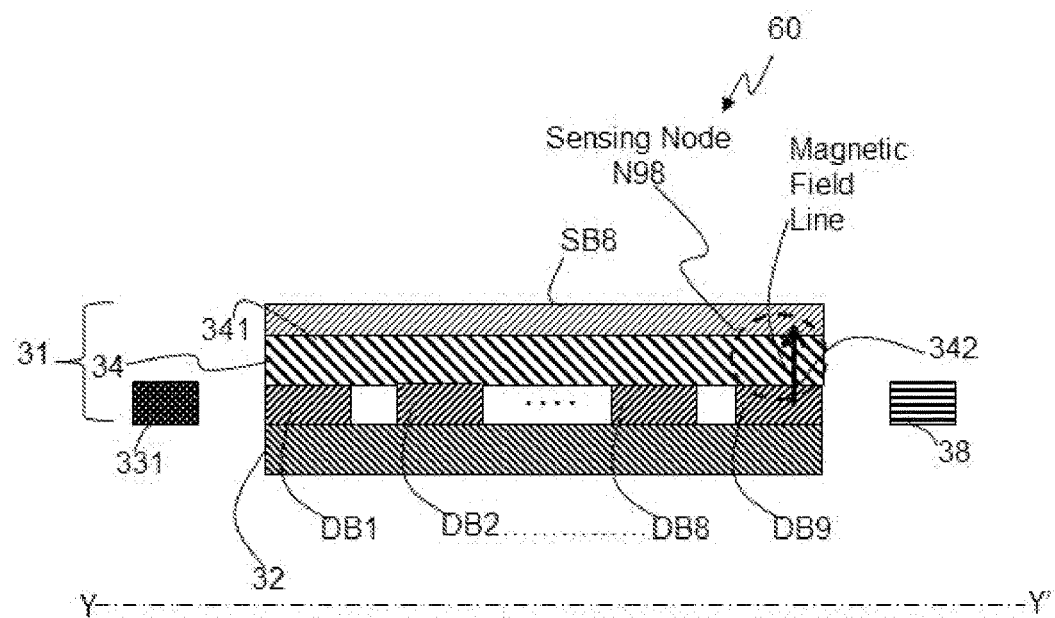
FIG. 6B shows a cross sectional view of the sixth embodiment of the present invention taken along Y-Y' line of FIG. 6A.
Figure 6C:
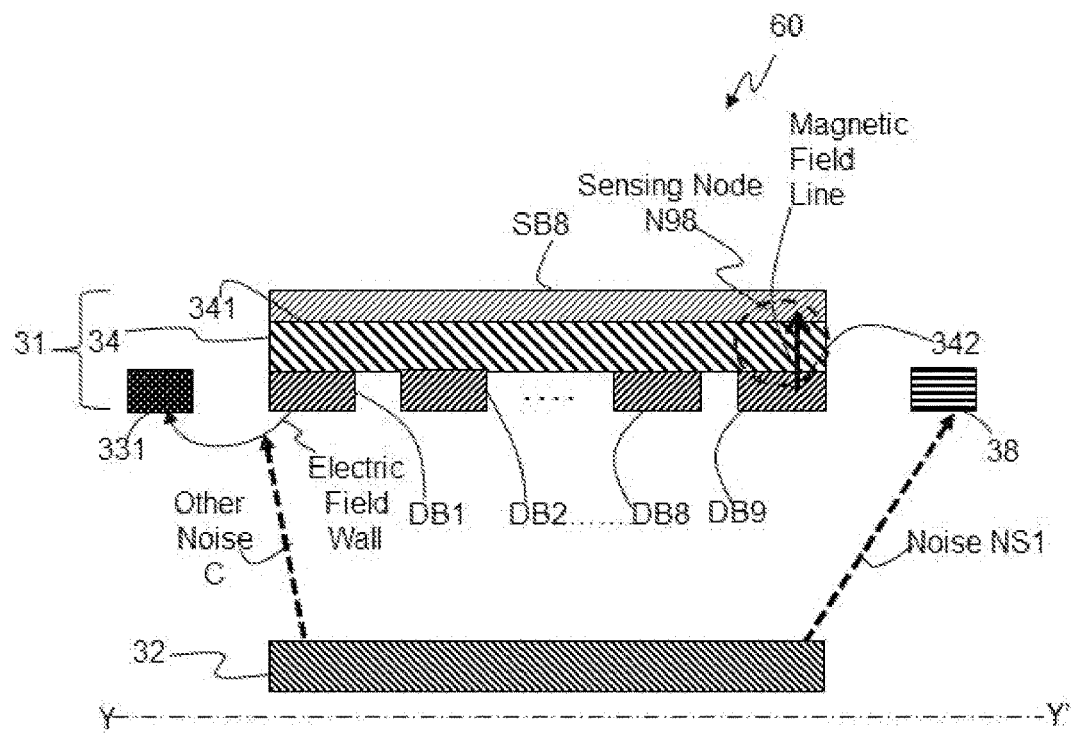
FIG. 6C shows an explosion view of FIG. 6B.

Please refer to both FIGS. 6A-6C. FIG. 6A shows a top view of a noise-cancelled capacitive touch display apparatus according to a sixth embodiment of the present invention. FIG. 6B shows a cross sectional view of the sixth embodiment of the present invention taken along Y-Y' line of FIG. 6A. FIG. 6C shows an explosion view of FIG. 6B. The noise-cancelled capacitive touch display apparatus 60 of the sixth embodiment operates according to substantially the same mechanism as the noise-cancelled capacitive touch display apparatus 30, 40 and 50 of the above-mentioned embodiments, but is different in that: the first signal line 331 or the second signal line 332 is cut off a piece to form the noise cancellation line 38 of the noise-cancelled capacitive touch display apparatus 60 of this embodiment, and by cutting off the piece, the first signal line 331 or the second signal line 332 becomes disconnected, unlike what is shown in FIG. 3A, in which the noise cancellation line 35 only occupies a part along the shorter side direction (i.e., the width direction) of the imaginary shape, and the first signal line 331 or the second signal line 332 remains as one piece. In this embodiment, the right side first signal line 331, the noise cancellation line 38 and a gap formed in between form an imaginary shape, which is a rectangle and the longer side of this imaginary shape at least has the same length as the driving lines DB1~DB9; and/or, the upper side second signal line 332, the noise cancellation line 38 and a gap formed in between form an imaginary shape, which is a rectangle and the longer side of this imaginary shape at least has the same length as the sensing lines SB1~SB9. In the embodiment shown in FIG. 3A, the width (the length of the shorter side) of the noise cancellation line 35 is smaller than the width (the length of the shorter side) of the first signal line 331 or the second signal line 332. However, in the embodiment shown in FIG. 6A, the width of the noise cancellation line 38 is not necessarily smaller than the width of the first signal line 331 or the second signal line 332. But preferably, the width of the noise cancellation line 38 is smaller than or equal to the width of the first signal line 331 or the second signal line 332.

In addition to the above-mentioned difference that the first signal line 331 or the second signal line 332 becomes disconnected by cutting off a piece to form the noise cancellation line 38, the noise cancellation line 38 of the sixth embodiment has substantially the same advantages and efficacies as the noise cancellation line 35 of the above-mentioned embodiments, and the noise-cancelled capacitive touch display apparatus 60 of the sixth embodiment has substantially the same advantages and efficacies as the noise-cancelled capacitive touch display apparatus 30, 40 and of the above-mentioned embodiments, which are not redundantly repeated here.

Figure 7A:
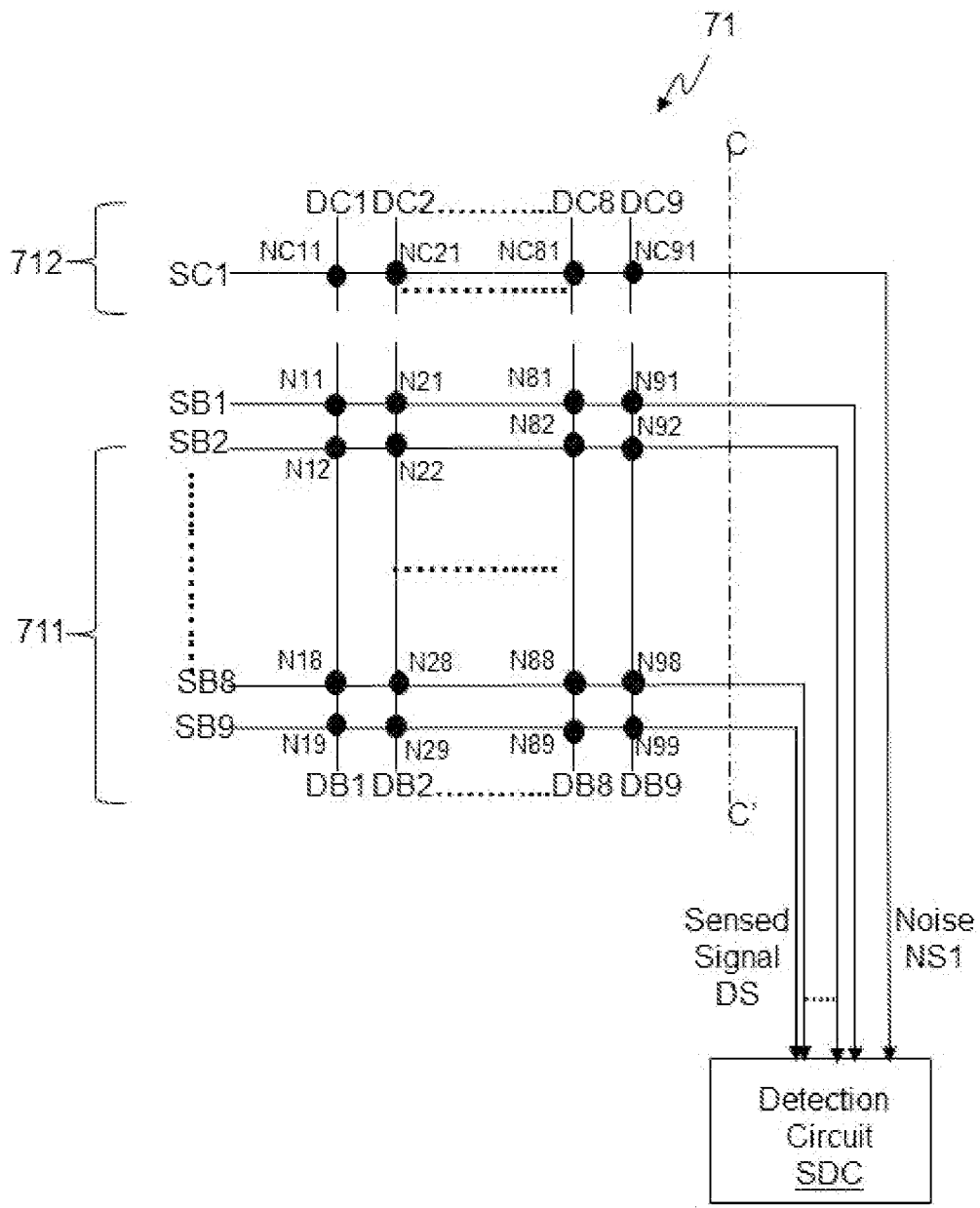
FIG. 7A shows a top view of a noise-cancelled capacitive touch display apparatus according to a seventh embodiment of the present invention.
Figure 7B:
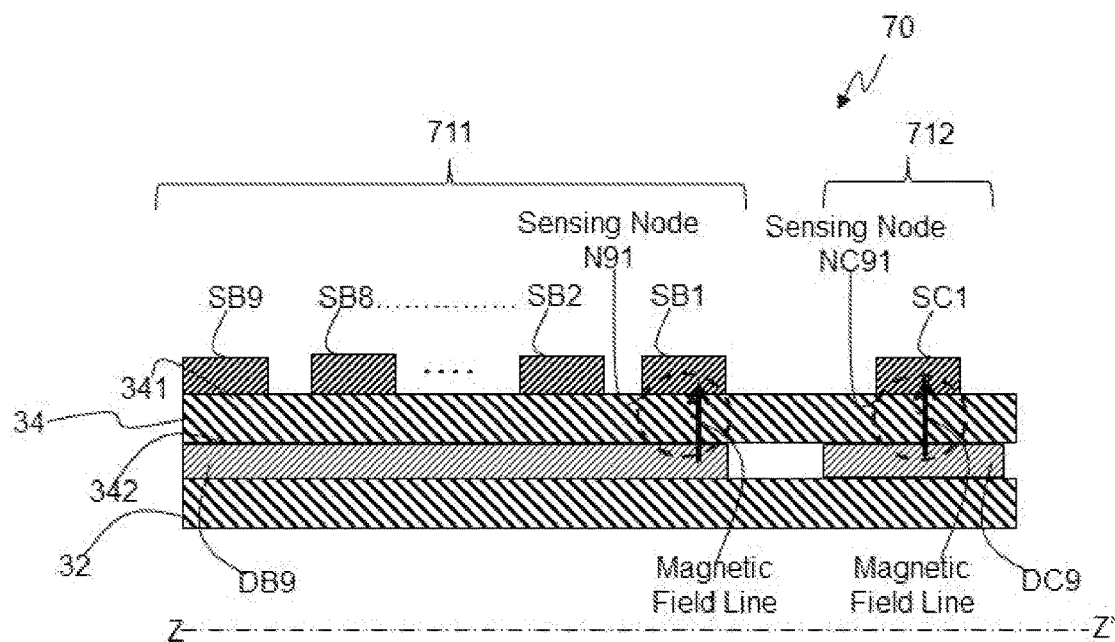
FIG. 7B shows a cross sectional view of the sixth embodiment of the present invention taken along Z-Z' line of FIG. 7A.
Figure 7C:
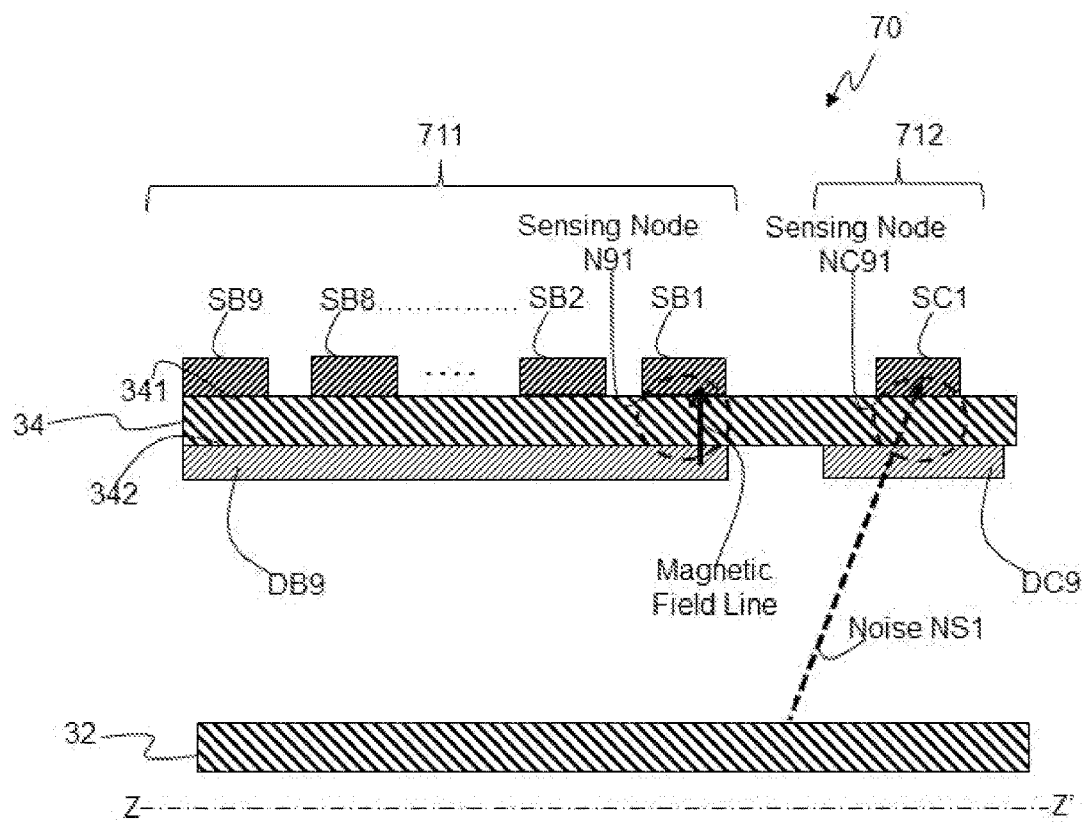
FIG. 7C shows an explosion view of FIG. 7B.

Please refer to FIGS. 7A and 7B. FIG. 7A shows a top view of a noise-cancelled capacitive touch display apparatus according to a seventh embodiment of the present invention. FIG. 7B shows a cross sectional view of the seventh embodiment of the present invention taken along Z-Z' line of FIG. 7A. The noise-cancelled capacitive touch display apparatus 70 of the seventh embodiment operates according to substantially the same mechanism as the noise-cancelled capacitive touch display apparatus 30 of the first embodiment, but is different in that: first, the capacitive touch sensor 71 of the noise-cancelled capacitive touch display apparatus 70 of this embodiment includes an active signal area 711 and a noise cancellation area 712. Second, the noise cancellation area 712 has a noise cancellation sensing line SC1 and plural noise cancellation driving lines DC1~DC9. Third, this embodiment employs the noise cancellation sensing line SC1 in the noise cancellation area 712, instead of the noise cancellation line 35 of the first embodiment, to receive the noise NS1 generated from the display panel 32. Fourth, there is no signal line provided around the periphery of the active signal area 711.

Note that the active signal area 711 has plural sensing lines SB1~SB9 and plural driving lines DB1~DB9. The sensing lines SB1~SB9 and the driving lines DB1~DB9 of the active signal area 711 have substantially the same advantages and efficacies as the sensing lines SB1~SB9 and the driving lines DB1~DB9 of the first embodiment, which are not redundantly repeated here.

In this embodiment, the noise cancellation sensing line SC1 and the noise cancellation driving lines DC1~DC9 of the noise cancellation area 712 are independently disposed and separated from the sensing lines SB1~SB9 and the driving lines DB1~DB9 of the active signal area 711. For example, in one embodiment, the noise cancellation sensing line SC1 is parallel with the first direction (which is the lateral direction in this embodiment) and located outside of an outermost sensing line SB1 of the active signal area 711. In another embodiment, the noise cancellation sensing line SC1 can be located outside of another outermost sensing line SB9 of the active signal area 711. From the top view, the noise cancellation sensing line SC1 is parallel with the sensing lines SB1~SB9 of the active signal area 711. The noise cancellation driving lines DC1~DC9 are parallel with each other and extend along a second direction (which is the longitudinal direction in this embodiment). Preferably, the first direction and second direction are orthogonal to each other. However, such arrangement is preferable but not absolutely necessary; it is also practicable as long as the sensing lines SB1~SB9 and the driving lines DB1~DB9, from a top view of FIG. 7A, intersect with each other. In one embodiment, for example, the noise cancellation sensing line SC1 is located outside of an outermost sensing line SB1 of the active signal area 711, and the noise cancellation sensing line SC1 and the noise cancellation driving lines DC1~DC9 intersect with each other from the top view of FIG. 7A and are located at different elevation levels from the cross sectional view of FIG. 7B.

Still referring to FIGS. 7A-7B, the sensing nodes NC11, NC21, . . . , NC81, and NC91 are provided, from the top view of FIG. 7A, at the intersections where the noise cancellation driving lines DC1~DC9 and one noise cancellation sensing line SC1 overlap with one another. For example, as shown in FIG. 7A, the capacitive touch sensor 71 includes 9 noise cancellation driving lines DC1~DC9 and one noise cancellation sensing line SC1, thereby forming a total of 9 individual and spatially separated sensing nodes NC11, NC81, . . . , NC81 and NC91.

Please refer to FIG. 7B. As shown in FIG. 7B, the capacitive touch sensor 71 further includes a substrate 34. The sensing lines SB1~SB9 of the active signal area 711 and the noise cancellation sensing line SC1 of the noise cancellation area 712 can be located at one side 341 of the substrate 34. And, the driving lines DB1~DB9 of the active signal area 711 and the noise cancellation driving lines DC1~DC9 of the noise cancellation area 712 can be located at another side 342 of the substrate 34. That is, the substrate 34 is located between a plane whereon the sensing lines SB1~SB9 of the active signal area 711 and the noise cancellation sensing line SC1 of the noise cancellation area 712 are located and another plane whereon the driving lines DB1~DB9 of the active signal area 711 and the noise cancellation driving lines DC1~DC9 of the noise cancellation area 712 are located. However, note that the driving lines DB1~DB9 of the active signal area 711 do not directly connect the noise cancellation driving lines DC1~DC9 of the noise cancellation area 712; the driving lines DB1~DB9 are electrically isolated from the noise cancellation driving lines DC1~DC9 (preferably, they are at different voltage levels from one another). The noise cancellation driving lines DC1~DC9 of the noise cancellation area 712 are connected in serial with each other and are all connected to ground.

By the above arrangement, the noise cancellation sensing line SC1 of this embodiment is capable of receiving the noise NS1 from the display panel 32 completely and therefore obtaining precise information of the noise NS1. A detection circuit SDC (as shown in FIG. 7A) can perform a noise cancellation process according to the noise NS1 received by the noise cancellation sensing line SC1 and a sensed signal DS generated from the sensing lines SB1~SB9, to obtain a noise-cancelled sensed signal WS (please refer to FIG. 8; the details as to how the detection circuit SDC perform a noise cancellation process according to the noise NS1 received by the noise cancellation sensing line SC1 will be discussed later). Consequently, by the noise cancellation sensing line SC1 which obtains the precise information of the noise NS1 from the display panel 32, this embodiment can correctly calculate the influences caused by the noise NS1.

In this embodiment, the details as to how the sensing lines SB1~SB9 of the active signal area 711 are capacitively coupled to the corresponding driving lines DB1~DB9 of the active signal area 711 at each of the intersections (i.e., the sensing nodes N11, N12, N13 . . . , N98, and N99) where a change of a mutual capacitance is sensible to generate a sensed signal DS are substantially the same as the first embodiment, which are not redundantly repeated here.

Figure 8:
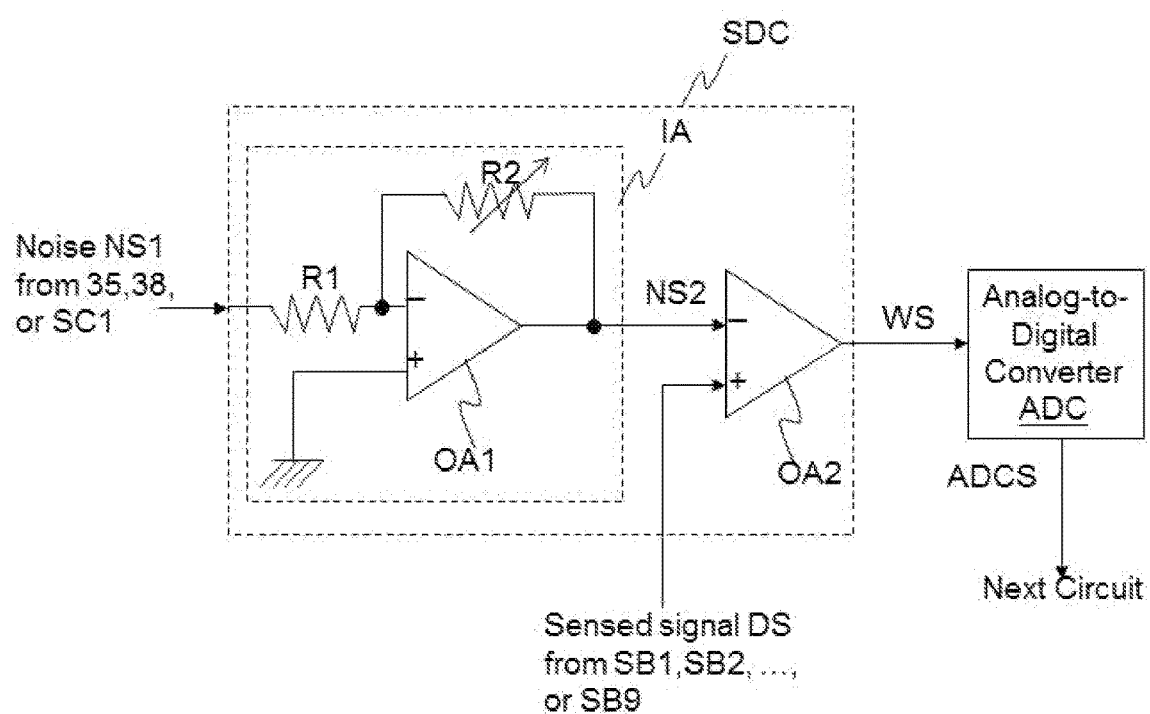
FIG. 8 shows a detection circuit according to an embodiment of the present invention.

Please refer to FIG. 8 in conjugation with FIGS. 3A, 6A and 7A. FIG. 8 shows a detection circuit according to an embodiment of the present invention. The present invention can further include a detection circuit SDC. As shown in FIG. 3A and FIG. 6A, the detection circuit SDC can be coupled to the sensing lines SB1~SB9 and the noise cancellation line 35 or 38. Or, as shown in FIG. 7A, the detection circuit SDC can be coupled to the sensing lines SB1~SB9 and the noise cancellation sensing line SC1. The detection circuit SDC generates a noise-cancelled sensed signal WS according to a noise NS1 received by the noise cancellation line 35 or 38 or the noise cancellation line SC1 and a sensed signal DS generated from each sensing line SB1~SB9.

The detection circuit SDC includes an inverter amplifier IA and an operational amplifier OA2. The inverter amplifier IA includes a first resistor R1, a second resistor R2 and an operational amplifier OA1. A first end of the first resistor R1 acts as an input terminal for the inverter amplifier IA, and a second end of the first resistor R1 is coupled to a negative input terminal of the operational amplifier OA1. The second resistor R2 is a variable resistor whose first end and second end are respectively coupled to the negative input terminal and an output terminal of the operational amplifier OA1. The positive input terminal of the operational amplifier OA1 is coupled to ground (i.e., 0V), while the output terminal of the operational amplifier OA1 acts as an output terminal of the inverter amplifier IA.

Referring to FIG. 8, when the display panel 32 is touched, a change in the mutual capacitance causes a corresponding change in sensed voltage at a corresponding sensing node. Under such circumstance, on one hand, the sensed signal DS generated from a corresponding sensing line SB1~SB9 will be inputted into the positive input terminal of the operational amplifier OA2; on the other hand, the first end of the first resistor R1 will receive a noise NS1 which is received by the noise cancellation line 35 or 38 or the noise cancellation line SC1. Because the circuit generating the noise NS1 and the circuit generating the sensed signal DS may not be matched with each other, it may be required to scale up or scale down the noise NS1 or the sensed signal DS by a multiple. Such multiple can be determined according to the capacitance of the generation circuit and/or other parameters. For example, assuming that the ratio for the sensed signal DS to the noise NS1 is N:1, under such circumstance, it is required to increase a gain of the noise NS1 by a factor of N (i.e., the gained noise NS2 is N times of the noise NS1), and the resulted gained noise NS2 is inputted into the operational amplifier OA2. To give an example, if the ratio of the noise NS1 to the gained noise NS2 should be 1:N, when a resistance of the first resistor R1 is for example 10 k ohm, the resistance of the second resistor R2 (the variable resistor) can be adjusted to 10 Nk ohm so that the ratio of the noise NS1 to the gained noise NS2 becomes 1:N. The gain of the noise NS1 is increased by a factor of N, so the mismatch between the sensed signal DS and the noise NS1 can be neutralized and there is no mismatch between the sensed signal DS and the gained noise NS2. The gained noise NS2 is inputted into the negative input terminal of the operational amplifier OA2 and the sensed signal DS is inputted into the positive input terminal of the operational amplifier OA2, so that the operational amplifier OA2 generates a noise-cancelled sensed signal WS at its output terminal. An analog-to-digital converter ADC converts the noise-cancelled sensed signal WS to a digital sensed signal ADCS, so that the succeeding processing circuit can receive and process digital sensed signal ADCS.

The present invention has been described in considerable detail with reference to certain preferred embodiments thereof. It should be understood that the description is for illustrative purpose, not for limiting the scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, in the embodiments shown in FIGS. 3A-3C, 4A-4B, 5A-5B and 6A-6C, it is not necessary to provide the first signal lines 331 and the second signal lines 332 around all four sides at the outer periphery of the sensing array; instead, the first signal line 331 can be provided at only one side and/or the second signal lines 332 can be provided at only one side. Besides, the signal lines at two neighboring sides do not have to be entirely connected to each other; instead, there can be a space between the signal lines at two neighboring sides. For another example, the noise cancellation line 35 can be at the same side of the substrate as the sensing lines SB1~SB9, but at a different side of the substrate from the driving lines DB1~DB9. In view of the foregoing, the spirit of the present invention should cover all such and other modifications and variations, which should be interpreted to fall within the scope of the following claims and their equivalents.

What is claimed is:

1. A noise-cancelled capacitive touch display apparatus, comprising:
   a display panel; and
   a capacitive touch sensor on or above the display panel, wherein the capacitive touch sensor includes:
   a first electrode and a second electrode which form a mutual capacitance in between, for sensing a signal;
   a signal line, which is located outside of the first electrode or the second electrode, wherein when the signal line is located outside of the first electrode, from a top view in a direction perpendicular to the display panel, the signal line overlaps or does not overlap with the second electrode, and when the signal line is located outside of the second electrode, from the top view, the signal line overlaps or does not overlap with the first electrode; and a noise cancellation line for receiving a noise generated from the display panel, wherein the signal line includes a thicker portion and a thinner portion such that the thinner portion forms an inward recess to accommodate the noise cancellation line, whereby the signal line, the noise cancellation line and a gap formed between the signal line and the noise cancellation line, form a rectangle shape, and wherein the signal line and the noise cancellation line are at different voltage levels, and wherein the signal line and the noise cancellation line are located at a same elevation level from a cross sectional view in a direction parallel to the display panel;

wherein the signal line and the second electrode are at different voltage levels such that the signal line and a part of the second electrode form an electric field wall.

2. The noise-cancelled capacitive touch display apparatus of claim 1, wherein:

the first electrode includes a plurality of sensing lines, which are parallel with each other and extend along a first direction; and the second electrode includes a plurality of driving lines, which are parallel with each other and extend along a second direction, wherein the sensing lines and the driving lines intersect with each other from the top view to form a capacitive electric field, and are located at different elevation levels from a cross sectional view, and wherein the second direction is orthogonal to the first direction;

wherein:

when the signal line is located outside of an outermost driving line in the first direction and parallel to the second direction, a longer side of the rectangle shape is at least as long as the driving line; and when the signal line is located outside of an outermost sensing line in the second direction and parallel to the first direction, a longer side of the rectangle shape is at least as long as the sensing line.

3. The noise-cancelled capacitive touch display apparatus of claim 2, wherein the signal line, the noise cancellation line and the driving lines are located at the same elevation level from the cross sectional view.

4. The noise-cancelled capacitive touch display apparatus of claim 2, wherein the driving lines are above the signal line and the noise cancellation line from the cross sectional view.

5. The noise-cancelled capacitive touch display apparatus of claim 1, wherein a thickness of the noise cancellation line is smaller than a thickness of each driving line.

6. The noise-cancelled capacitive touch display apparatus of claim 1, wherein a width of the noise cancellation line is smaller than or equal to a width of the signal line.

7. The noise-cancelled capacitive touch display apparatus of claim 2, wherein the capacitive touch sensor further includes a substrate, and wherein the sensing lines are at a first side of the substrate and the driving lines and the noise cancellation line are at a second side of the substrate opposite to the first side.

8. The noise-cancelled capacitive touch display apparatus of claim 2, wherein a voltage level of the signal line is higher than or lower than a voltage level of each driving line.

* * * * *